(12) United States Patent  
Celia (10) Patent No.: US 8,852,313 B2  
(45) Date of Patent: Oct. 7, 2014

(54) METHOD AND MATRIX FOR ENHANCING GROWTH MEDIA

(71) Applicant: Wayne M Celia, Woonsocket, RI (US)

(72) Inventor: Wayne M Celia, Woonsocket, RI (US)

(73) Assignee: Diversified Global Technologies, LLC, Woonsocket, RI (US)

( * ) Notice: Subject to any disclaimer, the term of this patent is extended or adjusted under 35 U.S.C. 154(b) by 0 days.

(21) Appl. No.: 13/749,010

(22) Filed: Jan. 24, 2013

(65) Prior Publication Data

US 2013/0150477 A1 Jun. 13, 2013

Related U.S. Application Data

(63) Continuation-in-part of application No. 12/728,940, filed on Mar. 22, 2010, now abandoned.

(60) Provisional application No. 61/162,390, filed on Mar. 23, 2009.

(51) Int. Cl.
| | |
|---|---|
| *C08L 75/04* | (2006.01) |
| *C05F 5/00* | (2006.01) |
| *C05F 11/00* | (2006.01) |
| *C05G 3/04* | (2006.01) |
| *C05G 3/00* | (2006.01) |
| *A01G 31/00* | (2006.01) |

(52) U.S. Cl.
CPC . *C08L 75/04* (2013.01); *C05G 3/04* (2013.01); *A01G 2031/003* (2013.01); *C05G 3/0047* (2013.01); *A01G 31/001* (2013.01)
USPC .................. 71/23; 71/27; 521/170

(58) Field of Classification Search
USPC .......................... 71/23, 27; 521/170
See application file for complete search history.

(56) References Cited

U.S. PATENT DOCUMENTS

| | | | | |
|---|---|---|---|---|
| 3,373,009 | A * | 3/1968 | Pruitt et al. ................ | 71/28 |
| 3,838,075 | A | 9/1974 | Dietrich et al. | |
| 3,889,417 | A | 6/1975 | Wood et al. | |
| 3,979,198 | A * | 9/1976 | Bardsley .................... | 71/1 |
| 4,137,200 | A | 1/1979 | Wood et al. | |
| 4,165,411 | A | 8/1979 | Marans et al. | |
| 4,365,025 | A | 12/1982 | Murch et al. | |
| 5,366,533 | A * | 11/1994 | Behel, Jr. .................... | 71/23 |
| 5,650,450 | A | 7/1997 | Lovette et al. | |
| 5,676,727 | A | 10/1997 | Radlein et al. | |
| 5,837,029 | A * | 11/1998 | Behel et al. ................ | 71/63 |
| 6,777,469 | B2 | 8/2004 | Blount | |
| 8,673,992 | B2 * | 3/2014 | Eckstein et al. ............ | 521/170 |
| 2002/0005053 | A1 | 1/2002 | Hayashi et al. | |
| 2008/0016769 | A1 | 1/2008 | Pearson | |
| 2009/0126433 | A1 | 5/2009 | Piskorz et al. | |
| 2010/0257775 | A1 | 10/2010 | Cheiky | |
| 2011/0086932 | A1* | 4/2011 | Herrington .................... | 521/170 |
| 2011/0086933 | A1* | 4/2011 | Herrington et al. .......... | 521/170 |

FOREIGN PATENT DOCUMENTS

| | | | |
|---|---|---|---|
| WO | 92/17518 | * | 10/1992 |
| WO | 94/07935 | * | 4/1994 |

* cited by examiner

*Primary Examiner* — Wayne Langel  
(74) *Attorney, Agent, or Firm* — IP Attorneys Group, LLC (57) ABSTRACT

The invention relates to a growth media comprising a hydrophilic polyurethane polymer matrix containing particulate inclusions. The invention also relates to a method of providing the growth media.

20 Claims, 3 Drawing Sheets

METHOD AND MATRIX FOR ENHANCING GROWTH MEDIA

CROSS REFERENCED TO RELATED APPLICATION

This patent application is a continuation in part of U.S. patent application Ser. No. 12/728,940 filed Mar. 23, 2010, titled "Method and Matrix for Enhancing Growth Media", which claims priority to and the benefit of U.S. Provisional Patent Application No. 61/162,390 filed Mar. 23, 2009, titled "Improved Growth Media Using Hydrophilic Foam," each of which is incorporated herein by reference in its entirety.

BACKGROUND OF THE INVENTION

Green roofing and green walls can provide many benefits to building managers and occupants as well as to local ecosystems. In natural ecosystems, vegetation and soil often affect the flux of moisture and of heat. When coupled with man-made structures, the services that vegetation provide can be harnessed for the mutual benefit of humans and the environment. Benefits include a reduction in storm surge, a potential lessening of the urban heat island effect, and lowered energy costs for the underlying building.

A living, vegetative layer atop a building behaves very differently than a standard, impervious roof. Storm surge normally associated with impervious surfaces is avoided due to the absorbent capabilities of soil which eases the strain on municipal stormwater systems meaning that smaller, less expensive systems can be installed. Additionally, evaporation and transpiration remove both excess moisture and heat from the roof surface.

However, in green roof applications, soil depth and, subsequently, plant type are limited due to the load-bearing capacity of roofs. Thus, drought tolerant plant species in thin-layer soils are often used. Soils with a high organic matter content help to retain enough moisture and support vegetation, but in warmer climates, organic matter decomposes quickly and soils lose water holding capacity and fertility over time.

Living layers on the exterior walls of buildings may provide additional benefits in terms of heat and humidity exchange and as insulation, and may help to visually integrate the building into the surrounding natural environment. Free-standing outdoor living walls may also be constructed for privacy screening, for shade, or for wind or erosion control.

Inside building structures, living layers on interior walls can provide similar benefits to the interior environment. A living wall may help maintain comfortable levels of humidity and oxygen through plant respiration, may insulate room walls, and may reduce the level of indoor pollutants through biofiltration.

These living wall structures are typically limited in soil depth and plant type, due to the load-bearing capacity of the walls and the required underlying supports. The growth medium used in living walls may also be further limited by the requirement for a vertical structure to keep the growth medium in place.

Soils have typically been used as growth media for green roofs and green walls, but present several issues. Soils can be categorized as mineral soils or organic soils as defined by the USDA in *Keys to Soil Taxonomy* 11$^{th}$ edition, USDA Natural Resources Conservation Service. Mineral soils typically contain less than 20% by weight organic material. Mineral soils are further distinguished by their clay, sand, and silt content as described in Brady, N.C., 1984, *The Nature and Properties of Soils*, 9th ed., MacMillan Publishing Company, New York, N.Y. Clay, sand, and silt are formed for the most part by physical or chemical weathering processes from rock, and retain the inorganic crystalline structure of the parent rocks from which they were formed. A large proportion of the mineral content in most soils is composed of silicates derived from the weathering of quartz.

Mineral soils tend to be poor substrates for plant growth. The minerals are typically hydrophobic and retain little water, and water flowing through the soil tends to dissolve and wash away inorganic plant nutrients. Being granular structures, mineral soils also tend to compress, leaving little room for root growth. Mineral soil can be improved for plant growth by adding organic material or biomass to the soil. The presence of hydrophilic polysaccharides in the organic matter increases the water retention and therefore the soluble mineral nutrient retention of the soil, while the cellular structure of the organic material reduces the tendency to compress, giving the roots space to grow. The organic matter also provides support for insect, annelid, bacterial, and microbial growth, slowly releasing the nutrients tied up in the biomass to the surrounding soil, adding to the organic content of the soil by the accumulation of biomass, and further decompressing the mineral soil by digging and tunneling or by growing against the mineral grains. The presence of microorganisms and other growth on the decomposing organic matter also helps to bind the mineral grains together, reducing erosion.

Organic soils are in general less dense, more nutritious for plant life, and more water retentive than mineral soils. Water retention is a measure both of the mass of water that can be retained by a soil and of the speed with which it evaporates from the soil. Organic soils also tend to retain more of the mineral nutrients required for healthy plant growth, both as a function of their water retention and in the microbes and bacteria responsible for the decomposition of the organic material.

The bulk dry density of the soil is a major factor limiting the use of soils in green wall or green roof applications. Soil is a three phase system consisting of the solid particles described above, liquid water held within the pore spaces by capillary forces and containing dissolved minerals, and gases in the empty spaces between particles not occupied by liquid. Soil density can be measured in at least three ways. The particle density of the soil is the density of the particles exclusive of the water and gas phases and can be defined as the mass of the solid particles divided by the volume occupied by the solid particles. The bulk dry density can be defined as the mass of the solid particles divided by the total volume occupied by the solid particles, the water, and the gas. The total density or wet density can be defined as the combined mass of solid particles and liquid divided by the total volume occupied by the solid particles, the liquid, and the gas. The wet density is highly variable due to the fluctuation of the moisture content and difficulty in measuring the moisture content of the soil. A more thorough description of the calculation of properties describing soils can be found in Yu et al, *Data Collection Handbook To Support Modeling Impacts Of Radioactive Material In Soil, Environmental Assessment and Information Sciences Division*, Argonne National Laboratory, Argonne, Ill. (1993), incorporated herein by reference in its entirety.

The dry bulk densities of most soils range from about 1100 kg/m$^3$ to about 1600 kg/m$^3$. This density of soil limits the thickness of the layer that can be supported by the underlying construction of the architectural structure, which further limits the choice of plants. Not only is the length of the plant root restricted due to the shallower soil, but the evaporation of water from the soil is a function of the surface area, and the thinner the soil layer, the more rapid the evaporation of water compared to the volume of the soil. These thin soil layers typically necessitate small, drought tolerant plants with shallow root systems. Because erosion is also mainly a factor of the surface area of the soil and because the plants are already limited by the thickness of the soil layer, thin layers of soil must usually be replaced or supplemented more frequently than thicker layers.

One growth medium used for both green roofs and living walls includes a combination of peat moss and soil, intended both to reduce the density of the soil and thus the weight of the soil layer, and to increase the organic content of the soil and thus the water retention and nutritive value of the soil. Peat moss is a low density organic material found predominately in natural deposits in shallow wetland areas. Depending on the type of the peat moss, dry bulk density may range between about 160 kg/m$^3$ to about 600 kg/m$^3$, while a more compressed form called humus may have a density up about 1000 kg/m$^3$. However, peat moss is generally flammable and often renders the entire structure unacceptable or unsafe. Peat moss has an autoignition temperature of 260° C., which means that even in the absence of a spark or flame, the material heated to that temperature could spontaneously combust. Additionally, peat moss and other types of fiber or matting used for the same purpose typically decompose rapidly and must be replaced frequently. This decomposition in itself produces heat, which has in some cases been blamed for the spontaneous fires in stored peat moss. Although the mineral portions of the soil are not generally flammable, addition of peat moss, fiber, matting, and other forms of biomass such as mulch and shredded plant matter typically result in undesirably flammable material.

Fires in peat moss may be especially dangerous due to the burning characteristics of the materials. Peat moss fires tend to smolder for long periods of time, frequently erupting in hot spots if the surface is broken through, and produce large amounts of carbon monoxide. In many cases, peat fires are simply allowed to burn until all of the peat is consumed due to the dangers involved to firefighters, and fires in naturally occurring peat deposits have been allowed to burn for years.

Additionally, soil, especially on non-horizontal surfaces such as sloped roofs or vertical walls, exhibits erosion, during which particles of dirt move down the surface of the roof or spill out of the wall onto lower surfaces under the action of gravity, wind, or water flow. This necessitates frequent replacement or supplementation of the growth media. In some applications, fiber matting, cloth bags, and wooden supports have been used to control erosion, but all of these solutions increase the risk of fire and although erosion may be slowed it is still an important source of loss and necessary replacement of the growth medium.

Soil in itself is not an especially desirable material for construction of roof and wall structures. The unattached granular structure results in erosion and loss of material, which necessitates constant renewal and replacement, and especially in interior applications results in a constant need for cleaning surrounding areas. Handling the soil is a messy job, both in the initial construction and in the necessary renewals, resulting in spills, tracking, and loss. Maintaining the cleanliness of interior and exterior spaces near a soil roof or wall is a time consuming operation.

Soil is also a poor insulator. Depending on the source, the R-value for soil is variously reported as being between R-0.25 and R-1.0. R-value is a measure of the thermal resistance of a material, reported in the US in the units h·° F.·ft$^2$/(BTU·in). The R-value is the inverse of the thermal conductivity, which measures the rate of heat transfer through a building element over a given area under standardized conditions. The higher the R-value, the slower heat passes through the building element. For comparison, the R-value for fiberglass batting typically ranges between about R-3 and about R-5, which implies that a layer of soil would need to be at least from 3 to 5 times to about 12 to 40 times as thick as a layer of fiberglass batting to provide the same insulation. R-values of many materials have been measured, are frequently used in advertising of insulations, and can be found in multiple easily available sources in the building trades.

The R-value of an insulative material is not the only factor that affects the transfer of heat through the material. The presence of a vegetative layer, water in the soil, and a large thermal mass presented by the thickness of soil required to maintain a vegetative layer do modify the low insulative value of the soil somewhat. The transpiration of the vegetative layer and the evaporation or condensation of water in the soil layer also help to modify the transfer of heat. The thermal modifications of the vegetative layer and the presence of water are some of the drivers that have led to the development of soil-based green roofs in spite of the problems inherent in using soil as a substrate.

What is desired, therefore, is a growth media for green roofs and green walls that would show reduced erosion, reduced flammability, and reduced thermal conductivity compared to either mineral soil or organic soil media. It is also desired that any replacement growth media would retain sufficient water and nutrients to support a healthy, long-lasting vegetative layer.

For some limited applications, it has been proposed to use foam substrates as media for plant propagation which contain no soil. Plant propagation is sensitive to erosion, because watering recently planted seeds or cuttings can wash the mineral particles away from roots that have not yet established a firm support, or in some cases can physically wash the seeds away from the area where they are planted. This can result in disruption of the establishment of a root system and the death of the seed or cutting. Plant propagation is also sensitive to water retention; if the soil dries out too quickly, the new roots will wither before they are established, and if it stays too wet, they will rot. Dietrich, et al (U.S. Pat. No. 3,838,075) describe a hydrophilic betaine foam for plant propagation which has a density ranging between about 6 kg/m$^3$ and about 50 kg/m$^3$. In the embodiment suggested by Dietrich, the foam is cast into small elements, charged with seeds, and compressed with a solution of adhesive to hold the elements in a compressed form until planted. The elements can then be planted out in soil and serve as a safe spot in which the seed can germinate, with erosion and water retention controlled by the foam rather than the surrounding soil. Once the seed has germinated, the roots then grow into the soil giving the plant the necessary structure to continue growth. The elements described by Dietrich can also be preloaded with nutrients and worked into soil to serve as a soil amendment, adding both plant nutrients and water retention to the surrounding soil.

A similar hydrophilic foam has been disclosed by Wood et al (U.S. Pat. No. 3,889,417), in the form of a foam sheet used as a carrier for seeds, herbicides, pesticides, and the like. The sheet is typically either spread on or dug into the existing soil and can serve as a safe place for plant germination, after which the plant establishes itself on the underlying soil. However, plants quickly outgrow these small elements, and neither of these provides sufficient support for plants to grow and thrive for a useful span of time in the absence of underlying soil.

To address the flammability of polyurethane foams, flame retardant polyurethanes have recently been developed incorporating large quantities of alumina trihydrate in the hydrophilic polyurethane foams, for example Marans et al (U.S. Pat. No. 4,165,411) and Murch et al (U.S. Pat. No. 4,365,025). Unfortunately, high levels of aluminum have been shown to be highly toxic to plant root plasma membranes and to inhibit cell division, cell extension, and transport. See for example Mossor-Pietraszewska, "*Effect of aluminium on plant growth and metabolism*", Acta Biochimica Polonica 48(3), 673-686.

What is desired, therefore, is a growth media that can serve as a support for a healthy vegetative layer in the absence of underlying or surrounding soil, and that has reduced flammability.

SUMMARY OF THE INVENTION

It is therefore an object of the invention to provide a growth media that promotes plant growth with reduced erosion and increased water holding capacity.

Another desire is a growth media that is malleable so it may be used in a wide array of applications.

Another desire is a growth media having reduced flammability and reduced thermal conductivity.

Another desire is a growth media that will support robust plant growth.

These and other objects are achieved by a growth media that uses a polyurethane matrix infused with particulate inclusions to reduce flammability and thermal conductivity, and a water absorbing polymer to better retain moisture. The invention also deposits or disperses minerals essential in the polymer for plant growth. The material retains more moisture than prior art growth media with lower initial density. Minerals are bound in the matrix releasing nutrients slowly for plant root uptake. Water-insoluble, low density, low flammability particulate inclusions bound in the polymer matrix further reduce both the flammability and the thermal conductivity of the foam. The invention is a less flammable, better insulating polymer matrix, which promotes plant growth.

In some embodiments, the particulate inclusions are particles of charred organic matter.

The growth media comprises a matrix including particulate inclusions and a hydrophilic polyurethane foam. In some embodiments, the growth media comprises a matrix including a reduced flammability organic matter, a hydrophilic polyurethane prepolymer, and water for mixing said hydrophilic polyurethane prepolymer and said reduced flammability organic matter together into a malleable mixture. In some embodiments, the reduced flammability organic matter is an organic matter having an ignition temperature greater than approximately 400° C. In other embodiments, the organic matter has an ignition temperature greater than approximately 450° C. In still other embodiments, the organic matter has an ignition temperature greater than 500° C. The increase in ignition temperature of the particulate inclusions in the matrix results in a lowering of the flammability of the growth media and makes it safer to use especially in interior and structural applications.

In some embodiments the reduced flammability organic matter is a charred organic matter. In some embodiments, a charred organic matter is selected from the group consisting of charred pine biomass, charred peanut biomass, charred paulownia biomass, and combinations thereof. In some of these embodiments, the charred pine biomass is between approximately 12 and approximately 15 weight percent of the matrix. In an optional embodiment, the charred peanut biomass is between approximately 10 and approximately 12 weight percent of the matrix. In a further embodiment, the charred paulownia biomass is between approximately 13 and approximately 20 weight percent of the matrix. In yet a further embodiment, the charred paulownia biomass is between approximately 10 and approximately 12 weight percent of the matrix.

In some of these embodiments, uncharred paulownia biomass is used as the reduced flammability organic matter. In some embodiments, the paulownia biomass is between approximately 13 and approximately 20 weight percent of the matrix.

In other embodiments, the matrix includes a surfactant of approximately 1 weight percent of the matrix. In another embodiment, the matrix includes a citric acid of approximately 0.31 weight percent of the matrix.

In some embodiments, the water is between approximately 44.3 and approximately 36.7 weight percent of the matrix.

In further embodiments, the hydrophilic polyurethane prepolymer is between approximately 8 and approximately 15 weight percent of the matrix. In many embodiments the hydrophilic polyurethane prepolymer is selected to give a foam density after reaction of between about 60 kg/m$^3$ and about 120 kg/m$^3$. In other embodiments the hydrophilic polyurethane prepolymer is selected to give a foam density after reaction of between about 60 kg/m$^3$ and about 90 kg/m$^3$. In some embodiments the hydrophilic polyurethane prepolymer is an isocyanate capped polyether polyol.

In another aspect of the invention, a method of providing a matrix for enhancing growth includes the steps of providing a hydrophilic polyurethane prepolymer, providing particulate inclusions, and mixing the hydrophilic polyurethane prepolymer with the particulate inclusions for dispersing the particulate inclusions throughout the hydrophilic polyurethane prepolymer. In another aspect of the invention, a method of providing a matrix for enhancing growth includes the steps of providing an organic matter having an ignition temperature of greater than approximately 400° C., providing a hydrophilic polyurethane prepolymer, and mixing the hydrophilic polyurethane prepolymer with the organic matter for dispersing the organic matter within the hydrophilic polyurethane prepolymer.

In some embodiments, the method includes selecting the particulate inclusions from the group consisting of charred pine biomass, charred peanut biomass, charred paulownia biomass, uncharred paulownia biomass, and combinations thereof. In some of these embodiments, the method includes charring between approximately 13 and approximately 20 weight percent of paulownia biomass to provide the organic matter. In an optional embodiment, the method includes mixing approximately 1 weight percent of a surfactant into the matrix. In yet a further embodiment, the method includes mixing approximately 0.31 weight percent of a citric acid into the matrix.

In some embodiments, the method includes mixing between approximately 44.3 and approximately 36.7 weight percent of water into the matrix for providing a slurry.

In another embodiment, the method includes mixing between approximately 8 and approximately 15 weight percent of the hydrophilic polyurethane prepolymer into the matrix.

In a more specific embodiment, a matrix for enhancing growth includes a charred organic matter comprising a pine biomass, a peanut biomass, and a paulownia biomass; a hydrophilic polyurethane prepolymer; a surfactant; a citric acid; and the charred organic matter, the surfactant, and the citric acid are dispersed within the hydrophilic polyurethane prepolymer.

In one embodiment, the matrix includes water between approximately 36.7 and approximately 44.3 weight percent of the matrix.

In another embodiment, the hydrophilic polyurethane prepolymer is between approximately 8 and approximately 15 weight percent of the matrix.

In some embodiments, the hydrophilic polyurethane prepolymer is an isocyanate capped polyether polyol.

BRIEF DESCRIPTION OF DRAWINGS

FIG. 2-A depicts a use of the matrix shown in FIG. 1 in accordance with the invention.

FIG. 2-B depicts a use of the matrix shown in FIG. 1 in accordance with the invention.

FIG. 2-C depicts a use of the matrix shown in FIG. 1 in accordance with the invention.

DETAILED DESCRIPTION

The invention relates to particulate inclusions embedded in a medium for enhancing growth. In some embodiments, these particulate inclusions are embedded in a hydrophilic polyurethane foam to provide an enhanced growth matrix. In many embodiments, the enhanced growth matrix exhibits reduced flammability. In other embodiments, the enhanced growth matrix exhibits reduced thermal conductivity. In still other embodiments, the enhanced growth matrix exhibits enhanced support for vegetative growth.

In some embodiments, the particulate inclusions have a high ignition temperature. The ignition temperature is the temperature at which the material will support combustion when it is exposed to a flame and air. This is also called the fire point. The ignition temperature is typically higher than the flash point, which is the lowest temperature at which a material will form an ignitable mixture in air, and lower than the autoignition temperature, which is the temperature at which the material will spontaneously ignite without a source of ignition. The higher the ignition temperature of a material, the hotter the material will need to be to sustain a fire. Most materials have an ignition temperature, but some materials are more difficult to ignite than others. For example, the ignition temperature of decayed wood is about 150° C., the ignition temperature of most hardwoods is around 220° C., and the ignition temperature of iron is around 1340° C.

In some embodiments of this invention, the particulate inclusions have an ignition temperature greater than about 400° C. As an incandescent light bulb can reach a temperature between about 100° C. and about 300° C., it can easily be seen that an ignition temperature above this range would be important for applications which might be exposed to common structural sources of heat. An ignition temperature greater than about 400° C. affords a reasonable level of safety for normal structural applications.

Increasing the ignition temperature above 400° C. can provide additional safety due to the heat flux required to increase the temperature of the matrix to the point where the inclusions could sustain a fire. Higher temperature heat sources such as halogen lights may warm the surface of an inclusion to the point where it could ignite if it was exposed to an ignition source. In other embodiments suitable for locations adjacent to such heat sources, the particulate inclusions have an ignition temperature greater than about 450° C. In still other embodiments suitable for applications where ignition sources are prevalent such as garages, kitchens, or areas adjacent to fireplaces, chimneys or furnaces, the particulate inclusions have an ignition temperature greater than about 500° C. In these embodiments where there is a strong possibility of exposure to sparks, a spark landing on such a particulate inclusion would need to heat the material to at least 500° C. before it would sustain combustion.

In some embodiments, the particulate inclusions are inorganic solids. In some embodiments, wherein the particulate inclusions are inorganic solids, such inorganic solids include but are not limited to gypsum, cement, concrete, asbestos, vermiculite, perlite, ceramics, cementitious plasters, gypsum plasters, mineral wool, glass wool, ceramic wool, zeolites, sodium silicates, aluminum silicates, calcium silicates, and combinations thereof. In other embodiments, the particulate inclusions are organic solids, including but not limited to polystyrene, expanded polystyrene, ABS plastics, polyesters, PTFE, PVC, polycarbonates, polypropylenes, and combinations thereof.

In some embodiments, the particulate inclusions are combinations of inorganic and organic material, including but not limited to cementitious plasters or concretes incorporating polymer beads, and gypsum plasters incorporating polymer beads. These materials benefit from the lower densities of the polymer beads and the insulative properties especially of expanded polymer beads. In one embodiment, the particulate inclusions are expanded polystyrene aggregate concretes. Chen and Liu have shown that concrete containing 55% by volume expanded polystyrene beads has a density less than 40% that of traditional concrete (see e.g. Chen and Liu, "*Properties of lightweight expanded polystyrene concrete reinforced with steel fiber*", Cement and Concrete Research 34 (2004) 1259-1263, and "*Mechanical properties of polymer-modified concretes containing expanded polystyrene beads*", Construction and Building Materials 21 (2007) 7-11), each incorporated by reference herein in its entirety). The presence of discrete voids in the expanded polystyrene beads also reduces the thermal conductivity of the material, and poor heat transfer from the foam matrix to the concrete to the polystyrene further reduces the thermal conductivity of the resulting matrix. In the applications studied by Chen and Liu, the primary limitation of adding additional organic matter and further reducing the density and thermal conductivity was the reduced structural strength of the resulting concrete. In this application, the strength of the concrete is not a limitation, and the proportion of polystyrene can be increased to as much as about 80% by volume. Similar concretions prepared from gypsum plasters and polymer beads are used as particulate inclusions in other embodiments of this invention.

In other embodiments, the particulate inclusions are intumescent materials. Intumescent materials are materials which undergo changes when exposed to heat that slow the progression of the fire. Typically these materials are hydrates which release significant amounts of water when heated, while swelling into larger, less dense, and less thermally conductive structures. The water released cools the surrounding areas, and the resulting less thermally conductive structures slow the transfer of heat through the material, slowing the spread of the fire. Other intumescent materials release halogens when heated, and others release mineral acids, both absorbing the free radicals involved in the combustion process and increasing the temperature required to sustain combustion. H. Z.

Vandersall describes many materials used as intumescents in *Journal of Fire and Flammability* 2, 87 (1971), incorporated by reference herein.

In some embodiments wherein the particulate inclusions are organic solids, the organic solids comprise biomass or thermochemically altered biomass. Biomass is bulk organic matter obtained originally from living organisms without the intervention of geological processes. This organic matter can be distinguished from petrochemicals and coals, which are formed from biomass by geological processes. In many embodiments, the biomass is residual plant material, including but not limited to wood chips, leaves, bark, pine needles, mulch, and combinations thereof. In other embodiments, the biomass is residue or waste from processes which convert plant material to usable products, including but not limited to agricultural residue including stalks and other waste from harvested plants and grains; hulls and shells from harvested seeds and nuts; solid residue from juicing, pressing, extraction, or fermentation processes including ethanol production from corn, sugar production from sugar cane and sugar beets, and oil production from olives, seeds, or nuts; solid waste from wood products including sawdust and woodchips from lumber production and wastes from paper production; plant residue from clearing or maintaining land including bush and tree cuttings, grass clippings, and leaves; and microbial, algal, or fungal residues from fermentation, brewing, and pharmaceutical or chemical production processes.

In some embodiments, the particulate inclusions are thermally altered biomass including charred organic matter, where such organic matter includes, but is not limited to, charred cotton, paulownia, pine, and peanut residues. The invention discovered such charred organic matter is superior to uncharred biomass because, among other reasons, the charred organic matter is more fire resistant or flame retardant. By combining this charred organic matter with a TDI or MDI based hydrophilic foam, a superior growth media having a density between about 60 kg/m$^3$ and about 200 kg/m$^3$, low thermal conductivity, and high ignition temperature is formed. It is also possible to further enhance this material with the addition of additional nutrient sources or other materials to enhance plant growth or to provide disease or insect resistance. The addition of charred organic matter to the hydrophilic foam results in a product with a surprisingly low thermal conductivity, making it a better insulator than the foam without charred organic matter. Without being held to a single theory, this may be ascribed to the empty porous cellular structure of the charred organic material and poor transmission of heat from the foam matrix to the charred organic inclusions. This combination is unique and superior to existing growth media for various applications, such as green roof, living wall, and general horticulture uses.

Although the addition of biomass to soils typically increases the flammability of the resulting growth media, it has surprisingly been found that if the biomass is sufficiently charred, addition of the biomass decreases the flammability of the resulting growth media. While not asserting the action of a single mechanism to account for this difference, it is noted that the ignition temperature of the charred organic material is typically higher than the ignition temperature of the biomass from which it was prepared.

Charred organic matter is typically prepared by heating selected dry biomass to remove volatile organic components and to decompose the hemicellulose, cellulose, and lignin structures of the biomass to form carbonized structures. When uncharred wood or other biomass is exposed to flame, the hemicellulose, cellulose, and lignin structures give off flammable gases which accumulate in the cellular structure or at the surface of the biomass and ignite at relatively low temperatures, leading to fires which consume the wood or biomass. Under controlled temperature, rapid ventilation, or low oxygen conditions, the flammable gases can be safely removed and the hemicellulose, cellulose, and lignin structures are converted to carbonized structures. These carbonized structures, referred to throughout as "charred organic matter", or "char" are low density, porous, cellular, water-insoluble solids, occupying about 90% of the volume but having 25% or less of the density of the original biomass. Due to the fact that the easily volatilized organic components have been removed by the charring process, this charred organic matter has a high ignition temperature and is more difficult to ignite than the dried biomass from which it is prepared.

The charred organic matter for some embodiments is the material obtained by heating the dry biomass at temperatures between approximately 400° C. and approximately 600° C. until no further significant release of gas is detected. In some embodiments, a nitrogen sweep is employed in which gaseous nitrogen is passed through the heating biomass to remove the volatile gases as they are formed. Depending on the particular pyrolysis process involved, the time required for complete pyrolysis may be on the order of 30 minutes to a few hours for fixed bed pyrolysis systems (see e.g. Yorgun et al, "*Fixed-Bed Pyrolysis of Miscanthus x giganteus: Product Yields and Bio-Oil Characterization*", Energy Sources 25; 779-790 (2003)), or on the order of seconds for fast dry pyrolysis systems (see e.g. Piskorz et al, "*Fast pyrolysis of sweet sorghum and sweet sorghum bagasse*", Journal of Analytical and Applied Pyrolysis 46; 15-29 (1998)), Wet pyrolysis systems utilizing high-temperature steam have also been developed (see e.g. Piskorz, US Pat. App. 2009/0126433, incorporated by reference herein in its entirety).

Beall and Eickner have defined four general products separable by pyrolysis of wood: noncondensable gases including carbon monoxide, carbon dioxide, water and methane; pyroligneous products, which are condensable products containing more than 50% moisture; tar, which is condensable material that is moisture free; and charcoal. The chemistry of this process is reviewed in Beall and Eickner, *Thermal Degradation of Wood Components*, USDA Forest Service Research Paper FPL 130 (1970), incorporated herein by reference in its entirety. The wet pyrolysis method of Piskorz described previously generates the same components given different names, including oligomeric lignins for tars, and char for charcoal.

The components of wood primarily responsible for the thermal behavior of the wood include cellulose, hemicellulose, and lignin. Cellulose and hemicellulose are polysaccharides differing in the specific structure and geometry of the connections between their component sugar monomers. Hemicellulose is an amorphous material having a highly branched structure and little strength or resistance to acid or base hydrolyses, while cellulose has a regular linear structure with greater strength and chemical resistance. Being polysaccharides, both materials are hydrophilic, heavily oxygenated structures containing a large number of pendant hydroxyl moieties. Both of these structures respond similarly to pyrolysis, forming volatile cleavage products through depolymerization. Under certain pyrolysis conditions, dehydration across saccharide structures will crosslink adjacent saccharides, making them difficult to depolymerize and forming char on continued pyrolysis.

Lignin is a complex chemical compound forming an integral part of the secondary cell walls of plants. It has a large polymeric structure composed largely of polysubstituted aromatic structures. Lignin is more hydrophobic than cellulose or hemicellulose, and crosslinking of lignin to the polysaccharides controls the flow of water through the plant's vascular system. Lignin is more stable to thermal degradation than either cellulose or hemicellulose, and the mechanism of decomposition proceeds mainly through degradation of the side chains and pendant groups rather than through depolymerization. The remaining structure is an amorphous carbon structure from which most of the oxygen-containing side chains have been removed. This process has been described in, for example, Chu et al, "*The pyrolysis chemistry of a β-O-4 type oligomeric lignin model compound*", Green Chemistry (2013), 15, 125, incorporated by reference herein in its entirety.

When biomass is charred or pyrolyzed, therefore, almost all of the cellulose and hemicellulose is converted to volatile material and driven off, while the lignin is partially volatilized and mostly converted to an amorphous carbonized structure, containing few of the organic functional groups of the original biomass but retaining the shape of the cell walls from which it was derived. This residual carbonized structure is commonly referred to as "charcoal" or "char", and is frequently an undesired by product of bio-fuel extraction processes, the predominant target of current research into biomass pyrolysis. Because the lignin comprises about 25% to 30% of most plant biomass, the resulting char typically retains less than 25% of the original mass of the biomass, but because the char retains the structure of the original plant cells, the volume of the char is typically at least about 90% of the volume of the original biomass.

The charred organic matter resulting from pyrolysis is typically a hydrophobic material since most of the hydrophilic pendant groups of the lignin and almost all of the hydrophilic cellulose and hemicellulose have either been driven off or converted to carbonized structures. The material is also much lighter than the original biomass, having lost at least 75% of the mass but typically only about 10% of the volume of the original material. Because all of the volatile flammable components that could be removed at the pyrolysis temperatures have been removed, the ignition temperature of the char is typically higher than the pyrolysis temperature used to prepare it. The resulting cellular structure of the char results in low thermal conductivity through the material, and the absence of pendant structures and organic functional groups provides few structures susceptible to either chemical or biological decomposition. The charred organic material formed in this way has a high ignition temperature, low thermal conductivity, and is resistant to rot and decomposition.

In some embodiments, the ignition temperature of the charred organic material produced by the above dry pyrolysis method is greater than approximately 400° C. This provides a significant level of safety above temperatures encountered in typical structural applications. For a fire to be supported on such material, the temperature of the material would have to rise to at least 400° C. and the material would have to be exposed to an ignition source. Powerful incandescent lights, for example, can achieve temperatures of 300° C. under normal operation, and materials having lower ignition temperatures in contact would ignite if an ignition source was present. A typical hardwood, having an ignition temperature around or below 250° C. in contact with such a light would ignite given an ignition source. The charred organic matter of the current invention would still require a temperature change of at least an additional 100° C. to sustain a fire.

In other embodiments, the ignition temperature of the charred organic material is greater than approximately 450° C. In some embodiments, the ignition temperature of the resulting charred organic material is greater than 500° C. These levels of ignition temperature provide even higher levels of safety when applied to the charred organic matter of this invention, due to the low thermal conductivity of such material. Not only would the temperature need to rise significantly higher to support combustion, but the material transfers heat slower than uncharred biomass and would take longer to increase in temperature. Longer pyrolysis times and higher pyrolysis temperatures result in more complete conversion of cellulose, hemicellulose, and lignin structures to carbonized structures and increase the ignition temperature of the resulting material.

Surprisingly, paulownia biomass is a particularly suitable organic biomass for use in this invention. Paulownia is a fast growing species of hardwood that is uniquely flame retardant and rot-resistant. The ignition temperature of paulownia wood is reported to be 420 to 430° C., compared to the ignition temperature of 220 to 225° C. for most other hardwoods. The reduced flammability of paulownia wood has been attributed to its low lignin content, low density, and the empty, porous nature of the wood, which doesn't permit the flammable gases to accumulate sufficiently to maintain combustion. These characteristics also give the wood an unusually low density and low thermal conductivity. It chars rapidly without burning, and can be used in this invention as a reduced flammability particulate inclusion without charring. In many embodiments, uncharred paulownia biomass has been surprisingly found to exhibit similar properties and utility in this invention to charred biomass, and unlike biomass from other sources can be used without thermochemical alteration. A description of the thermal properties of paulownia can be found in Li and Oda, Journal of Materials Science (2007) 42(20):8544-8550, which is incorporated herein by reference in its entirety. Data including SEM micrographs of paulownia and cedar char published in Li et al, "*Fabrication of biomorphic SiC composites using wood preforms with different structures*", Ceramics International 38 (2012) 3089-3095, incorporated herein by reference in its entirety, shows that paulownia wood has a pore structure much larger than other hardwoods, resulting in a density of approximately 290 $kg/m^3$ compared to approximately 1100 $kg/m^3$ for cedar. These large pores and low density contribute to the rapid charring of paulownia wood without permitting the volatile gases formed to accumulate in sufficient concentration to ignite.

A "low flammability organic material" or "reduced flammability organic material" where used in this application is intended to refer to charred organic matter as previously described herein and to include uncharred paulownia biomass. For the purposes of this application, where "charred organic matter" is used without further specification in descriptive portions of this application, it can be assumed to include uncharred paulownia biomass and charred paulownia biomass, although other, more flammable uncharred biomaterials are not intended to be included.

Figure 1:
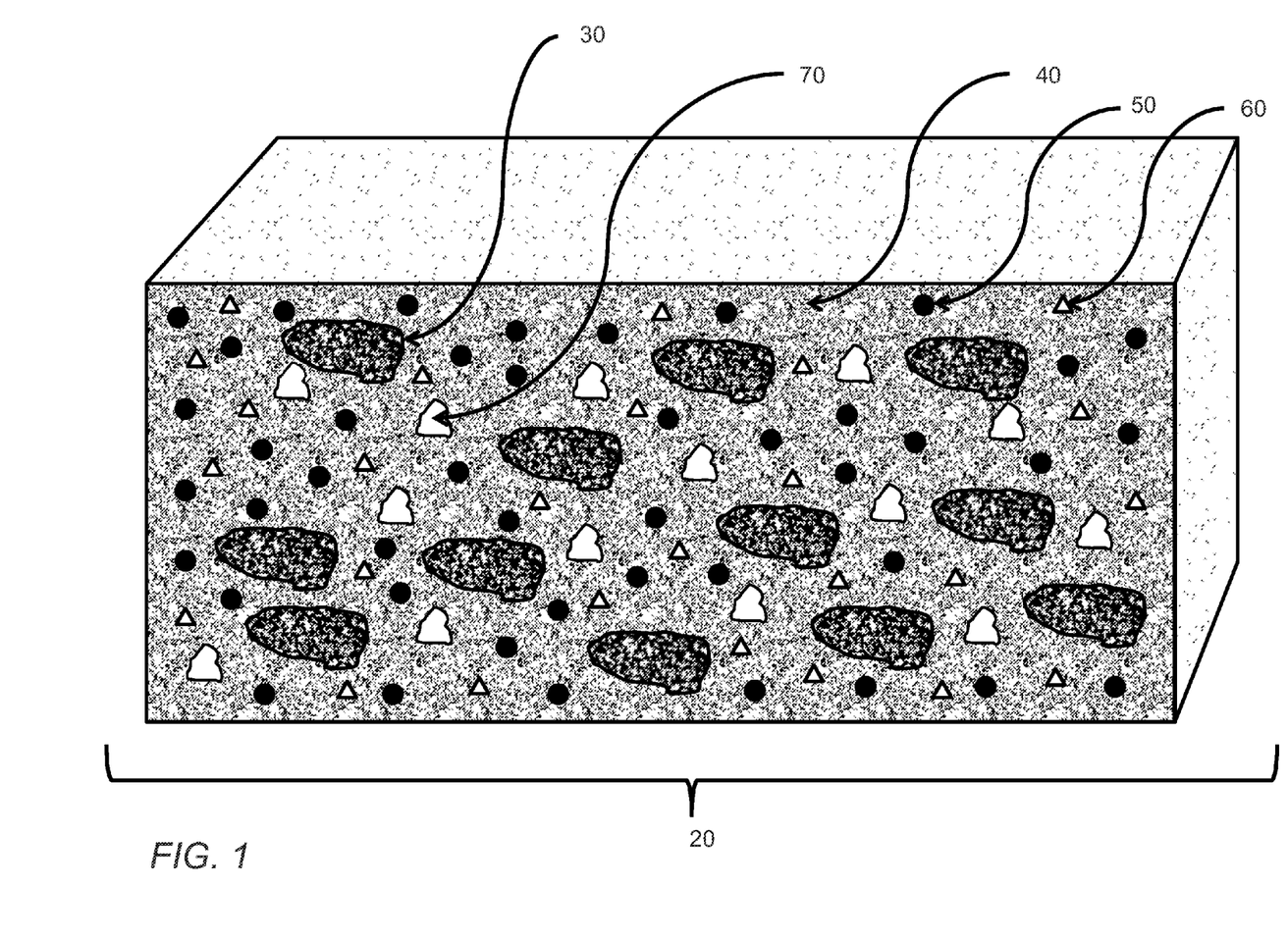
FIG. 1 depicts a cutaway view of the matrix in accordance with the invention.

In some embodiments, the particulate inclusions are solids which are substantially insoluble in water or in the hydrophilic polyurethane prepolymer, having a solubility of less than about 1 g/L in either the water or the hydrophilic polyurethane prepolymer. In some embodiments, the particulate inclusions are powders having a particle size less than about 2 mm. In other embodiments, the particulate inclusions are granules having a particle size between about 2 mm and about 10 mm. In some embodiments, the particulate inclusions are larger granules having a particle size between about 10 mm and about 50 mm. In other embodiments, the particulate inclusions have a particle size between about 50 mm and about 100 mm. In still other embodiments, the particle inclusions comprise a mixture of particle sizes. Insolubility in the water and the polyurethane prepolymer are required to maintain the discrete nature of the particulate inclusions and keep the insulative structures therein from being altered by dissolution in the mixture. The particle sizes are selected to control the mechanical properties of the mixture of polyurethane prepolymer and particulate inclusions, and of the matrix 20 that forms when the mixture cures.

In some embodiments wherein the particulate inclusions comprise particle sizes less than about 10 mm, a surfactant is added to help disperse the particles throughout the hydrophilic polyurethane prepolymer. In other embodiments wherein the particulate inclusions comprise particle sizes greater than about 10 mm, vigorous stirring of the slurry is used to disperse the particulate inclusions throughout the matrix. In some embodiments, thickeners are added to the slurry to prevent the particulate inclusions from settling out of the matrix before it is fully cured.

In other embodiments, the particulate inclusions 30 take any shape or size which can be dispersed throughout the polyurethane foam 40. In some embodiments, the particulate inclusions are fibrous. In other embodiments, the particulate inclusions are roughly rod shaped, having a length along a first dimension that is at least three times the value of a length along a second dimension. In other embodiments, the particulate inclusions are irregular amorphous solids. In still other embodiments, the particulate inclusions are regular geometric solids including but not limited to spheres, cubes, tetrahedra, polyhedra, cones, rods, and polygonal prisms.

In some embodiments, the hydrophilic polyurethane prepolymer for this invention is an isocyanate capped polyether polyol prepolymer. Commercial prepolymers of this type are available under the mark HYPOL® by Dow. Other suitable hydrophilic prepolymers can be purchased from a number of companies for use in the manufacture of foams. A representative list of prepolymers includes TREPOL® sold by Rynel, Nanopol sold by INOS Technologies, Prepol sold by Lendell Manufacturing, Inc. (St. Charles, Mich.), Hydropol sold by Mace Adhesives & Coatings Co., Inc., AQUAPOL® sold by Carpenter Co. (Richmond, Va.), and UREPOL® sold by EnviroChem Technologies.

Polyether polyols are polymers containing ether linkages between small alkyl groups. The simplest representative of this group is polyethylene glycol, having the repeat structure —[O—CH$_2$—CH$_2$]$_n$—, characterized by having ethylene subunits linked by ether functional groups. The presence of the repeating ether subunits increases the hydrophilicity of the polymer, and in some embodiments the hydrophilicity is further increased by adding pendant hydrophilic functional groups pendant from the alkyl groups in the polymer backbone. These polyether polyol chains are capped by one or more diisocyanate structures to from the hydrophilic polyurethane prepolymers. Exposure of the hydrophilic prepolymer to water causes polymerization of the prepolymers through the isocyanate functional groups to form a three-dimensional linked network of polymer chains. Gases released by the coupling reactions and water vapor produced by the heat generated by the reaction form gaseous voids in the three dimensional network, leading to the pore structure characteristic of a polyurethane foam. In some embodiments, additional blowing agents are added to control the pore structure and size in the finished foam. The process of polymerizing the prepolymers into the three dimensional foam matrices is referred to as curing. By controlling the reaction conditions, these prepolymers are reacted in water to form polymer foam matrices having a density ranging between about 60 kg/m$^3$ and about 120 kg/m$^3$, and pore sizes from about 10 μM to about 150 μM.

Density of a foam is dependent on the thickness of the cell walls between pores and the sizes of the pores. The thickness of the walls and the sizes of the pores will determine how much of the volume of the foam is empty space, and the remaining volume will be composed of the polymerized polyurethane prepolymer. The pore size and density of the growth media are related to its suitability for sustaining a vegetative surface. The root system growing through the growth matrix is providing the support for the upper portion of the plant; if the pores are too small, the root system will not be able to penetrate through the sponge, and if they are too large, the roots will be easily pulled out of the foam by environmental stresses such as wind or even the pull of gravity against the plant. The physical properties for some foam combinations appropriate for use in this invention can be found in U.S. Pat. No. 5,650,450 to Lovette, et al, incorporated by reference herein in its entirety. A further description of suitable hydrophilic polyurethane prepolymers can be found in U.S. Pat. No. 4,137,200 to Wood, et al, and in Polyurethane's Chemistry and Technology by Saunders and Frisch, Volume XVI Part 2, High Polymer Systems, each also incorporated by reference in its entirety.

In accordance with one embodiment of the invention, and shown in FIG. 1, matrix 20 is provided for enhancing growth. Matrix 20 includes particulate inclusions 30 dispersed within hydrophilic polyurethane foam 40. As shown, matrix 20 enhances growth with improved flammability resistance because the particulate inclusions 30 are resistant to ignition, wherein prior art peat moss is empirically tested and known to be flammable.

Figure 2:
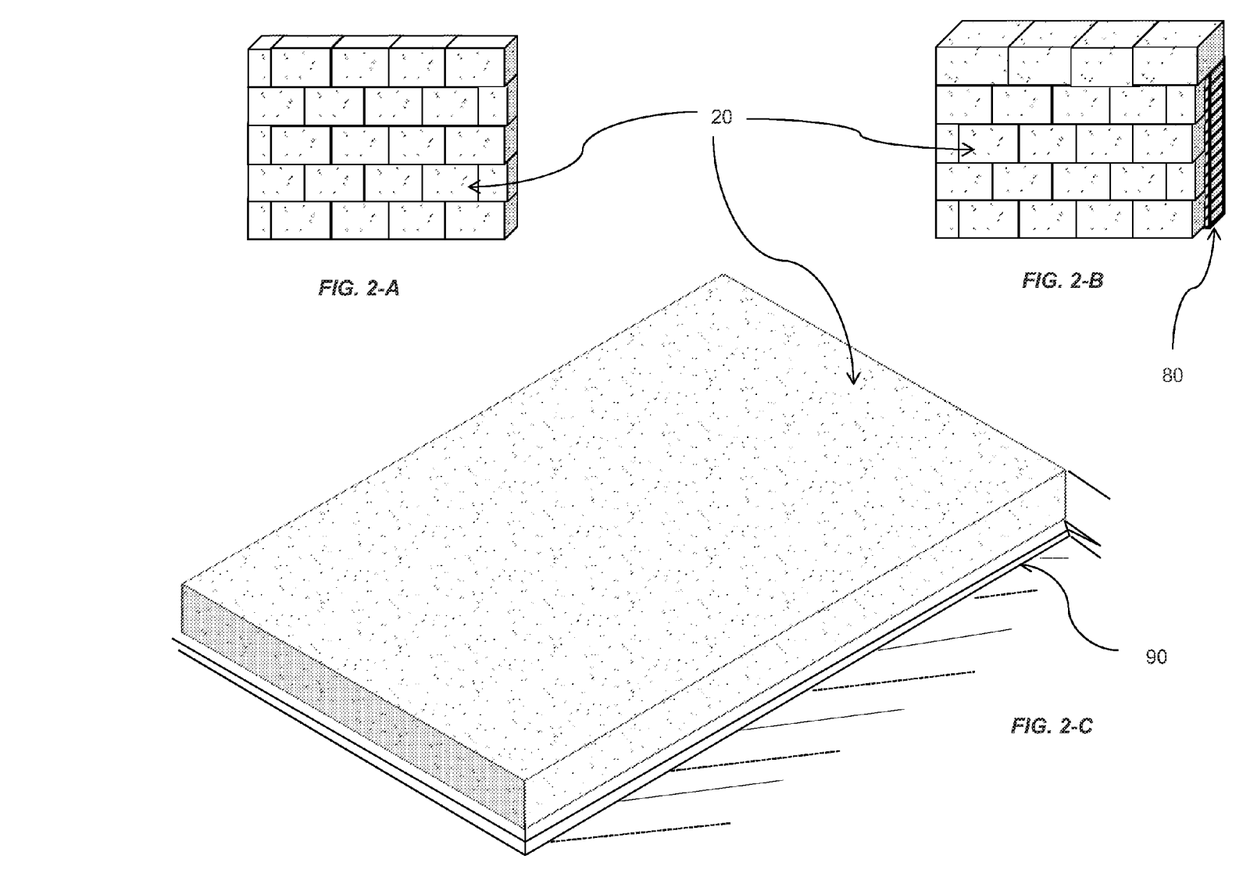

Matrix 20 is a fully reacted hydrophilic foam, which can be applied onto surfaces or substrates, such as a roof, garden, wall, or any location where growth is desired, as exemplified in FIGS. 2-A, 2-B, and 2-C. Examples shown in the figures are intended to be exemplary and not limiting to the uses of the invention. Because matrix is a single matrix rather than the mass of unattached granules forming the prior art soil, erosion is reduced. Moreover, because hydrophilic polyurethane foam 40 absorbs and holds approximately 10-20 times more water than dirt, the requirement of watering matrix 20 to maintain or promote growth is reduced. Hence, reduced erosion and reduced watering are advantages of matrix 20 over the prior art. Because the hydrophilic foam is an organic material and retains 10-20 times as much water as dirt, the addition of peat moss, mulch, or other organic materials as soil amendments is unnecessary.

As described previously, organic matter is typically added to soils as an amendment to mineral soils due to the presence in organic matter of hydrophilic structures to improve water retention, the presence of nutrients for animal, plant, and microbial life to encourage proliferation of organisms that will further decompose the biomass and release nutrients into the soil, and the low density of organic material compared to the mineral soil to which it is added. However, the polyurethane foam described is already more water retentive and lower density than the organic material typically added as a soil amendment, and does not have the granular structure leading to erosion that an organic supplement can help reduce. The flammability of organic biomass and the growth of organisms causing the rot and decomposition of the materials are both undesirable in the context of a growth media used for structural purposes in green walls and green roofs.

Charred organic material as described in this invention, however, has the opposite effect of adding biomass to dirt to prepare growth media. The charred organic matter used in this invention, due to its comparatively hydrophobic nature and cellular structure, forms pockets of empty space within the inclusions reducing the thermal conductivity of the foam, and the high ignition temperature reduces the flammability of the matrix. The charred organic matter is also resistant to rot and decomposition and provides little support for organisms which cause decomposition. While these would be undesirable characteristics for a soil amendment for a typical mineral soil, they are desirable characteristics in a growth media intended for structural use in green roofs and green walls. In these situations, the charred organic matter provides reduced weight, lower flammability, and improved rot resistance which are desirable in structural materials.

In some embodiments, charred organic matter 30 and the hydrophilic polyurethane prepolymer which will become hydrophilic polyurethane foam 40 after reaction, are mixed with water to provide a slurry or malleable mixture which is easier to form into any physical shape. In some embodiments, the mixture or slurry is formed into tiles, which after the polymerization reaction is complete, are then cut and applied to roofing as shown in FIG. 2-C, or to walls as shown in FIGS. 2-A and 2-B. In other embodiments, the slurry or mixture is cured and ground up into a powder. In further embodiments, the slurry or mixture is applied to a substrate and allowed to cure, resulting in the formation of matrix 20 in place on the substrate. In one embodiment, the substrate is a roof. In a second embodiment, the substrate is a wall. In some embodiments, the slurry or mixture is introduced into a mold and cured to form matrix 20. In some embodiments, the mixture or slurry is poured in a continuous process to form, after curing, continuous panels of matrix 20.

In many embodiments, the density of the media formed by this process is greater than 60 kg/m$^3$ and less than 200 kg/m$^3$. This is significantly less than that of the prior art soils, but still dense enough to provide a firm anchorage for larger or heavier plants if desired. If the foam is less dense than about 60 kg/m$^3$, there will be too much open space within the foam to provide a stable attachment for the plant roots and the choice of suitable plants will be undesirably limited. Use of polyurethane foam having densities within this range gives the advantage of providing support for the establishment of a vegetative layer while reducing the structural strength of the substrate required to support the growth media.

In some embodiments, mineral nutrients 70 including fertilizers are dissolved in the water or in the prepolymer, and are distributed throughout the polymer matrix during formation of the foam. In some embodiments, granules of mineral nutrients 70 are dispersed in the mixture of prepolymer, water, and charred organic matter, and remain embedded and distributed throughout the polymer matrix after formation of the foam. In some embodiments, these granules of mineral nutrients 70 include slow release fertilizers. In some embodiments, soluble nutrients are dissolved in an appropriate solvent, added to the matrix 20, and the solvent is evaporated to leave the nutrients dispersed on the solvent-accessible surfaces of the polyurethane foam 40.

In some embodiments, water is between approximately 55 and approximately 25 weight percent of matrix 20. In other embodiments, water is between approximately 50 and approximately 30 weight percent of matrix 20. In further embodiments, water is between approximately 44.3 and approximately 36.7 weight percent of matrix 20.

In another embodiment, particulate inclusions 30 are selected from the group consisting of charred pine biomass, charred peanut biomass, paulownia biomass, and combinations thereof.

In some embodiments where pine biomass is used, the charred pine biomass comprises between approximately 1 and approximately 35 weight percent of the matrix. Amounts below approximately 1 weight percent of biomass have a negligible effect on the ignition and thermal conductivity properties of the matrix, and amounts above approximately 35 weight percent of the matrix begin to exert a negative effect on plant growth. In some embodiments where peanut biomass is used, the charred peanut biomass comprises between approximately 1 and approximately 30 weight percent of the matrix to give similar advantageous properties. In some embodiments where charred paulownia biomass is used, the charred paulownia biomass comprises between approximately 1 and approximately 30 weight percent of the matrix to give similar advantageous properties. The lower density of charred peanut and paulownia biomass mean that lower weight percents will occupy the same volume in the final matrix compared to pine biomass.

In other embodiments where pine biomass is used, the charred pine biomass comprises between approximately 5 and approximately 25 weight percent of the matrix. This range advantageously reduces the amount of surfactant required as a dispersant for maintaining an even dispersion of the particulate inclusions throughout the slurry or malleable mixture. In some of these embodiments, the surfactant used to control foam properties is sufficient to maintain particle dispersion and no additional surfactant is required. In other embodiments where peanut biomass is used, the charred peanut biomass comprises between approximately 5 and approximately 20 weight percent of the matrix gives similar advantageous properties, and in other embodiments where charred paulownia biomass is used, the charred paulownia biomass comprises between approximately 5 and approximately 25 weight percent of the matrix to give similar properties.

In further embodiments where pine biomass is used, the charred pine biomass comprises between approximately 12 and approximately 15 weight percent of the matrix, which advantageously reduces the flammability of the growth media and forms a smooth slurry suitable for producing matrix 20 in a variety of forms. In further embodiments where peanut biomass is used, the charred peanut biomass comprises between approximately 10 and approximately 12 weight percent of the matrix to attain similar advantages. The lower density of charred peanut biomass compared to charred pine biomass results in larger volumes when measured by weight percent, and consequently the amounts of biomass in each range are lowered to account for the difference in volume occupied by the structures. The lower density of the particulate inclusions leads to lower weight for the final product and better thermal conductivity. In further embodiments where charred paulownia biomass is used, the charred paulownia biomass comprises between approximately 10 and approximately 18 weight percent of the matrix to attain similar advantages.

In some embodiments where paulownia biomass is used, the material is not charred before use. In some embodiments where paulownia biomass is used without being charred, the paulownia biomass comprises between approximately 5 and approximately 40 weight percent of the matrix. As the uncharred paulownia contains water and organic components which have been removed in the charred biomass, the weight percentage of paulownia required to achieve the same balance between ignition characteristics, thermal conductivity, and healthy plant growth is somewhat higher. In other embodiments where uncharred paulownia biomass is used, the paulownia biomass comprises between approximately 10 and approximately 30 weight percent of the matrix to attain advantageously lowered need for dispersants. In further embodiments where uncharred paulownia biomass is used, the paulownia biomass comprises between approximately 13 and approximately 20 weight percent of the matrix to attain reduced flammability and a smooth slurry.

The use of biomass within these ranges has the advantage of reducing the flammability and the thermal conductivity of the matrix 20. Increasing proportions of charred organic matter show a disproportionate decrease in the flammability of the growth matrix, due in part to the increased ignition temperature of the charred organic matter and in part to the low thermal conductivity, which increases the amount of time required for the charred organic matter to heat up to the ignition temperature. Amounts of biomass lower than about 1 weight percent have a negligible effect on the ignition characteristics and thermal conductivity of the foam matrix.

Amounts of charred organic matter below about 35 weight percent maintain healthy plant growth. The root structures of the plant grow primarily through the polyurethane foam portion of the matrix and a certain amount of water is required to maintain healthy plants; levels of charred organic matter greater than about 35 percent present less foam and retain less water than required for optimum growth. Because the pyrolysis conditions, pore sizes, and particle sizes of different biomasses result in chars having differing properties, the selection of appropriate proportions of biomass to hydrophilic polyurethane is in part dependent on the source organism and structure of the biomass, as indicated in the previous descriptions, and other particulate inclusions require greater or lesser proportions depending on the density and thermal conductivity of the particulate inclusions. A fixed weight percentage of a low density material will occupy more volume than the same weight percentage of a higher density material, with a correspondingly lower weight percentage required both to reduce the flammability of the material at the low end of the range, and to begin interfering with plant growth on the high end of the range.

In another embodiment, matrix 20 includes surfactant 50 for dispersing the particulate inclusions 30 throughout the matrix. Surfactants are chemicals which are used to lower the surface tension of a liquid, or to reduce the interfacial tension between two liquids or a liquid and a solid. Surfactants which are used to disperse particles in a solvent are also referred to as dispersants. Due to the difference in hydrophilicity between the particulate inclusions and the polyurethane prepolymer, in certain embodiments the particulate inclusions may tend to either clump up in or settle out of the slurry or malleable mixture. In many embodiments, the dispersants form layers at the surface of the particulate inclusions and allow them to disperse throughout the mixture of water and prepolymer, where they are bound in place when the matrix is formed.

In other embodiments in which the mixture of prepolymer and particulate inclusions makes a malleable mixture, a dispersant is unnecessary and the particulate inclusions are adequately dispersed by mechanical mixing. In these embodiments, the viscosity of the mixture is high enough that the particulate inclusions are unable to separate from the mixture before the matrix 20 cures and remain dispersed throughout the matrix. In some embodiments, thickeners are added to prevent the particulate inclusions from separating out of the matrix as it cures, or to improve the mechanical properties of the slurry or malleable mixture.

In another embodiment, surfactant 50 is added for controlling a physical property of hydrophilic polyurethane foam 40, such as cell size. A larger cell size promotes plant growth by enhancing oxygen exchange with the atmosphere and retaining moisture, much like pores in living organisms. However, if a cell size is too large, water will leak or spill out. The addition of a surfactant can be used to lower the interfacial tension between the polyurethane prepolymer and the water, resulting in thinner cell walls and smaller pores for the same density of foam. In some embodiments, surfactant 50 is between approximately 0 and approximately 10 weight percent of the matrix, which is sufficient to disperse higher concentrations of particulate inclusions, on the order of approximately 20 to approximately 30 weight percent, or larger particle sizes greater than approximately 50 mm. In other embodiments, surfactant 50 is between approximately 0 and approximately 3 weight percent of the matrix, which forms advantageously smaller pore sizes in the polyurethane foam 40 on the order of between approximately 60 and approximately 90 μM. In a further embodiment, matrix 20 includes surfactant 50 in an amount of approximately 1 weight percent of the matrix, which provides dispersion adequate for smaller particles less than about 20 mm and provides an advantageously higher density foam having a density between about 90 and about 120 kg/m$^3$ with pore sizes between about 10 μM and about 50 μM.

In certain embodiments, the same surfactant 50 acts as an effective dispersant for the particulate inclusions 30 and an appropriate modifier of the pore sizes and wall thickness of the polymer foam 40 within the matrix 20. In other embodiments, the surfactant 50 is comprised of a mixture of at least two surfactants, one acting as a dispersant for particulate inclusions and the other modifying the foam properties.

In another embodiment, matrix 20 includes citric acid 60 for controlling a pH level of matrix 20, where a controlled pH level slows a reaction time of prepolymer and charred organic matter 30. Without citric acid 60, the reaction time may occur so quickly that hydrophilic polyurethane foam 40 is not properly cured or charred organic matter 30 may not be adequately dispersed throughout matrix 20. In some embodiments, reaction time is desired to be after charred organic matter 30 is homogeneously mixed in matrix 20. In a further embodiment, matrix 20 includes citric acid 60 in an amount of approximately 0.31 weight percent of the matrix.

In yet another embodiment, citric acid 60 slows the reaction time between prepolymer and water (with any of the ingredients, including particulate inclusions 30). This is desired so that matrix 20 can be manipulated into the desired physical shape before exothermic reaction occurs and the hydrophilic polyurethane foam 40 is formed. Citric acid 60 slows this exothermic reaction by lowering the pH.

In further embodiments, when reacted within matrix 20, surfactant 50, citric acid 60, and nutrients 70 cannot be seen because they are embodied within the polymer foam 40.

In some embodiments, hydrophilic polyurethane foam 40 comprises between approximately 5 and approximately 40 weight percent of the matrix. In other embodiments where paulownia biomass is used, the paulownia biomass comprises between approximately 10 and approximately 30 weight percent of the matrix. In some embodiments, hydrophilic polyurethane prepolymer is between approximately 8 and approximately 15 weight percent of the matrix.

In one embodiment of the invention, the hydrophilic polyurethane prepolymer is between approximately 5 and approximately 40 weight percent of the matrix, the particulate inclusions are between approximately 10 and approximately 40 weight percent of the matrix, the surfactant is between approximately 0 and approximately 3 weight percent of the matrix, the citric acid is between approximately 0 and approximately 1 weight percent of the matrix, the mineral nutrients are between approximately 0 and approximately 10 weight percent of the matrix, and water is between approximately 30 and approximately 80 percent of the matrix.

Water is used for facilitating mixing and dispersion of the other components within matrix 20. When water is mixed with hydrophilic polyurethane prepolymer, particulate inclusions 30, and other constituents to comprise matrix 20, a malleable mixture or slurry is provided, which may be manipulated either before or after polymerization is complete to form customer-desired physical characteristics. In some embodiments in which a slurry is formed, the slurry is poured into a desired form and cures to produce the matrix 20. Slurries are typically viscous mixtures which can be poured or otherwise handled as liquids and take the shape of the container into which they are poured. Malleable mixtures are deformable materials such as putties, having a higher viscosity than slurries, which will retain their shape until a force is exerted and which can be handled like solids. There is a continuum of viscosities between thin, easily pourable liquids to thick, heavy semi-solids requiring considerable force to deform, all of which are intended to be encompassed by the expression "slurry or malleable mixture". In some embodiments in which a malleable mixture is formed, the malleable mixture is packed into forms and cures to provide matrix 20 in the shape of the form into which it is packed. In other embodiments in which a malleable mixture is produced, the malleable mixture is shaped and allowed to cure without a form. In still other embodiments, the malleable mixture is spread onto a substrate to form a layer of the desired thickness and cures in place to form matrix 20.

In some embodiments, the slurry or malleable mixture is formed into tiles which after reaction are then cut and applied to roofing of building structures 90 or walls 80. In other embodiments the slurry or malleable mixture is formed into flat panels which are cured and then applied to roofing of building structures 90 or walls 80. In some embodiments the slurry is poured into molds and cured. In one embodiment, the slurry or malleable mixture is cast into the shape of bricks which are used to form structures as shown in FIG. 2-A. In other embodiments, the slurry or malleable mixture is cured, dried, and ground up into a powder or cut into a desired shape.

In further cases, the slurry or malleable mixture is applied to a substrate and allowed to cure, wherein curing results in matrix 20. When the malleable mixture or slurry is applied to a roof, wall, or any other medium or substrate where plant growth is desired, matrix 20 cures after application. In some embodiments, forms are prepared on a substrate and the slurry or mixture is poured into the forms and allowed to cure.

Regardless of the application, water eventually evaporates out of matrix 20, but the other constituents remain. Once water evaporates, the percentages of the remaining constituents that provide matrix 20 increase because water is no longer a component of matrix 20.

For example, if water was originally 44.3% of matrix 20 and paulownia was originally 13% of matrix 20, evaporation of water results in paulownia becoming approximately 29.3% of matrix 20. The percentages of the other remaining constituents will also increase in like manner.

In some embodiments, the invention comprises a substrate to which the matrix 20 is affixed. In some embodiments, the substrate is a wall. In other embodiments, the substrate is a roof. In still other embodiments, the substrate is a floor. In one representative embodiment, the invention comprises a roof to which matrix 20 is affixed. In another embodiment, the invention comprises a wall to which matrix 20 is affixed. In some embodiments, the invention comprises a roof to which tiles comprised of matrix 20 have been affixed to form a surface suitable for supporting a vegetative layer. In many embodiments, tiles or panels comprised of matrix 20 are affixed to substrates by attachment means including but not limited to adhesives, nails, screws, staples, snaps, hook-and-loop fasteners, carpet tack strips and combinations thereof. In other embodiments, the slurry or malleable mixture is poured onto the substrate and allowed to cure in place. In some of these embodiments, the mixture adheres to the substrate when it has cured, while in other embodiments, matrix 20 stays in place without adhering to the substrate. In still other embodiments, matrix 20 is further attached to the substrate after curing.

Figure 3:
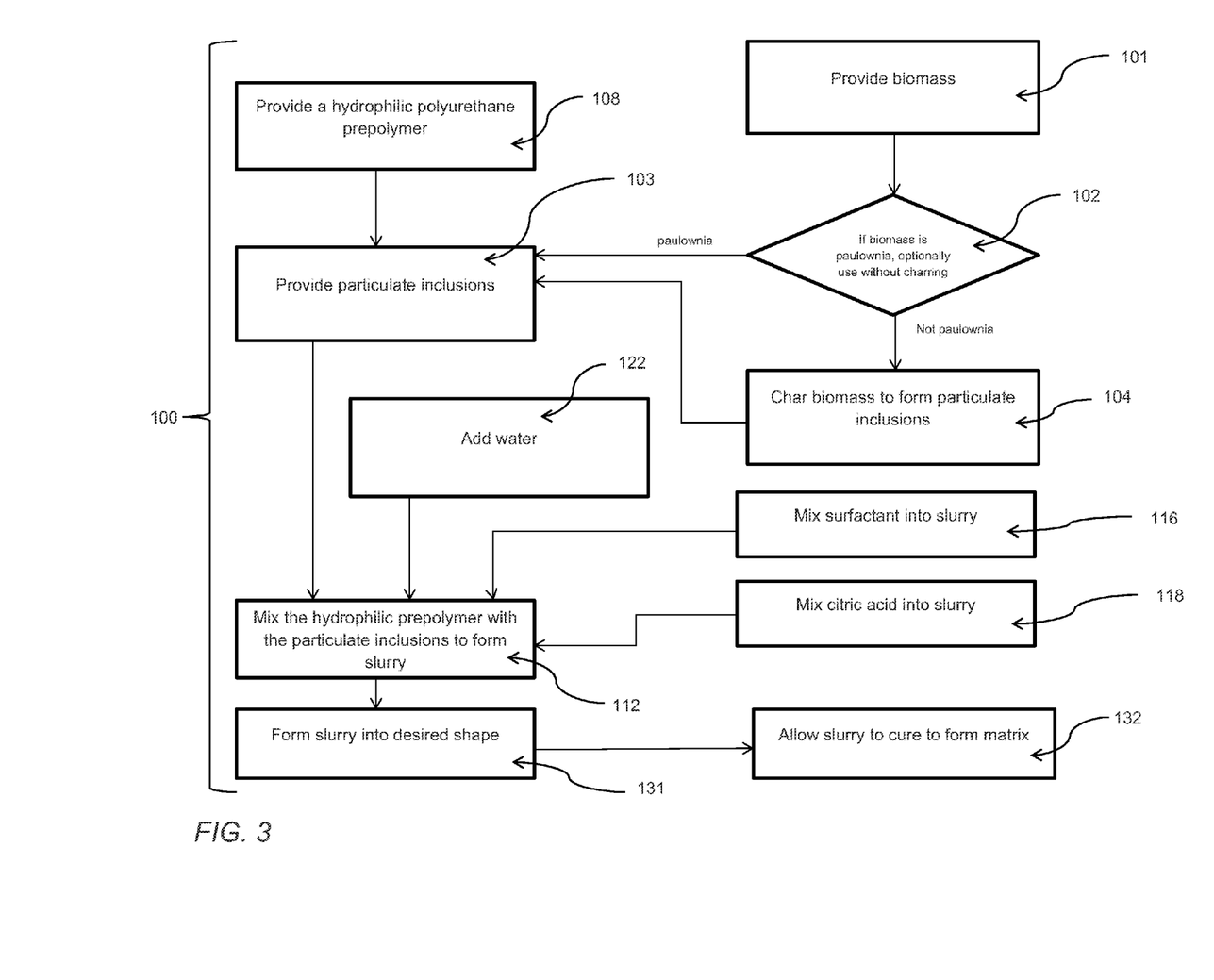
FIG. 3 depicts a method of providing the matrix shown in FIG. 1 in accordance with the invention.

As shown in FIG. 3, in another aspect of the invention, method 100 for providing a matrix for enhancing growth includes the steps of providing a hydrophilic polyurethane prepolymer 108, providing particulate inclusions 103, and mixing 112 the hydrophilic polyurethane prepolymer with the particulate inclusions for dispersing the particulate inclusions within the hydrophilic polyurethane prepolymer. In another aspect of the invention, method 100 for providing a matrix for enhancing growth includes the steps of charring 104 an organic matter to provide 103 the particulate inclusions, providing 108 a hydrophilic polyurethane prepolymer, and mixing 112 the hydrophilic polyurethane prepolymer with the charred organic matter for dispersing the charred organic matter within the hydrophilic polyurethane prepolymer. Where used in method steps in this patent, charring is the process of pyrolyzing an organic matter until no further significant release of gas is detected, and charred biomass or charred organic matter is the non-volatile material remaining after the biomass has been so treated.

In some embodiments, method 100 includes the step of selecting the charred organic matter from the group consisting of pine biomass, peanut biomass, paulownia biomass, and combinations thereof.

In other embodiments, method 100 includes charring 104 between approximately 13 and approximately 20 weight percent of paulownia biomass.

In further embodiments, method 100 mixes 116 approximately 1 weight percent of a surfactant into the matrix. In another embodiment, method 100 mixes 118 approximately 0.31 weight percent of a citric acid into the matrix.

In further embodiments, method 100 includes mixing 122 between approximately 44.3 and approximately 36.7 weight percent of water into the matrix for providing a slurry. In yet another embodiment, method 100 includes mixing between approximately 8 and approximately 15 weight percent of the hydrophilic polyurethane prepolymer into the matrix.

In some embodiments, method 100 includes providing 108 a hydrophilic polyurethane prepolymer, providing 101 biomass, charring 104 the biomass to form the particulate inclusions, adding 122 water, and mixing 112 the hydrophilic prepolymer with the particulate inclusions to form a slurry. In some embodiments, the method includes the step of forming 131 the slurry into a desired shape, and allowing 132 the slurry to cure to form matrix 20.

In some embodiments in which paulownia is used as the biomass, the step of charring 104 the biomass is unnecessary and the paulownia biomass is used as the particulate inclusions.

The following table comprises empirical data of charred organic biomass that are dispersed throughout matrix 20.

TABLE 1

| Feedstock | Form | Particle size | Pyrolysis Temperature (° C.) |
|---|---|---|---|
| pine chip | char | powder | 400 |
| | | | 600 |
| | | granule | 400 |
| | | | 600 |
| peanut hull | char | powder | 400 |
| | | | 600 |
| | | granule | 400 |
| | | | 600 |
| paulownia | biomass | granule | none |
| | biomass | granule | none |
| | | silica-coated granule | none |
| | | Total # of materials | 11 |
| | | ×3 reps | 33 |

What is claimed is:

1. A matrix for enhancing growth, comprising
a hydrophilic polyurethane foam;
particulate inclusions having an ignition temperature greater than approximately 400° C.; and
wherein the particulate inclusions are distributed throughout the polyurethane foam.

2. The matrix according to claim 1, wherein said particulate inclusions are selected from the group consisting of paulownia biomass, charred pine biomass, charred peanut biomass, and combinations thereof.

3. The matrix according to claim 2, wherein said particulate inclusions are charred pine biomass comprising between approximately 12 and approximately 15 weight percent of the matrix.

4. The matrix according to claim 2, wherein said particulate inclusions are charred peanut biomass comprising between approximately 10 and approximately 12 weight percent of the matrix.

5. The matrix according to claim 2, wherein said particulate inclusions are paulownia biomass comprising between approximately 13 and approximately 20 weight percent of the matrix.

6. The matrix according to claim 1, wherein said particulate inclusions have an ignition temperature greater than 450° C.

7. The matrix according to claim 1, wherein said particulate inclusions have an ignition temperature greater than 500° C.

8. The matrix according to claim 1, further comprising a surfactant of approximately 1 weight percent of the matrix.

9. The matrix according to claim 1, further comprising citric acid as approximately 0.31 weight percent of the matrix.

10. The matrix according to claim 1, wherein the hydrophilic polyurethane prepolymer is selected to give a foam density after reaction of between about 60 kg/m$^3$ and about 120 kg/m$^3$.

11. A method of providing a matrix for enhancing growth, comprising the steps of:
providing a hydrophilic polyurethane prepolymer;
providing particulate inclusions having an ignition temperature greater than approximately 400° C.;
and
mixing the hydrophilic polyurethane prepolymer with the particulate inclusions for dispersing the particulate inclusions within the hydrophilic polyurethane prepolymer.

12. The method according to claim 11, further comprising the step of selecting the particulate inclusions from the group consisting of charred pine biomass, charred peanut biomass, paulownia biomass, and combinations thereof.

13. The method according to claim 12, further comprising the step of charring between approximately 13 and approximately 20 weight percent of paulownia biomass to provide the particulate inclusions.

14. The method according to claim 11, further comprising the step of mixing approximately 1 weight percent of a surfactant into the matrix.

15. The method according to claim 11, further comprising the step of mixing approximately 0.31 weight percent of citric acid into the matrix.

16. The method according to claim 11, further comprising the step of mixing between approximately 44.3 and approximately 36.7 weight percent of water into the matrix for providing a slurry.

17. The method according to claim 11, further comprising the step of mixing between approximately 8 and approximately 15 weight percent of the hydrophilic polyurethane prepolymer into the matrix.

18. A matrix for enhancing growth, comprising:
a charred organic matter selected from the group consisting of a pine biomass, a peanut biomass, a paulownia biomass, and combinations thereof;
a hydrophilic polyurethane prepolymer;
a surfactant;
citric acid; and
said charred organic matter, said surfactant, and said citric acid are dispersed within said hydrophilic polyurethane prepolymer.

19. The matrix according to claim 18, wherein the charred organic matter is a biomass that has been pyrolyzed at between about 400° C. and about 600° C.

20. The matrix according to claim 18, wherein said hydrophilic polyurethane prepolymer is between approximately 8 and approximately 15 weight percent of the matrix.

* * * * *